United States Patent
Griffith et al.

(10) Patent No.: US 8,270,148 B2
(45) Date of Patent: Sep. 18, 2012

(54) SUSPENSION FOR A PRESSURE SENSITIVE TOUCH DISPLAY OR PANEL

(76) Inventors: David Griffith, Apex, NC (US); Gary Smith, Youngsville, NC (US); Mark Lackey, Holly Springs, NC (US); Anders Mölne, Cary, NC (US)

(*) Notice: Subject to any disclaimer, the term of this patent is extended or adjusted under 35 U.S.C. 154(b) by 167 days.

(21) Appl. No.: 12/831,772

(22) Filed: Jul. 7, 2010

(65) Prior Publication Data

US 2011/0051334 A1   Mar. 3, 2011

Related U.S. Application Data

(63) Continuation-in-part of application No. PCT/US2008/003374, filed on Mar. 14, 2008.

(60) Provisional application No. 61/270,344, filed on Jul. 7, 2009.

(51) Int. Cl.
*G06F 1/16* (2006.01)

(52) U.S. Cl. .............. 361/679.01; 349/187; 345/169; 455/462

(58) Field of Classification Search .......... 349/106, 349/84, 189, 187; 345/30, 204, 690, 173, 345/174, 107, 55, 169; 455/575.3, 575.7, 455/41.5, 462; 361/679.3, 679.01, 679.04, 361/679.29, 679.06, 679.21, 679.47, 679.27, 361/679.33, 679.54

See application file for complete search history.

(56) References Cited

U.S. PATENT DOCUMENTS

| | | | |
|---|---|---|---|
| 3,657,475 | A | 4/1972 | Peronneau et al. |
| 4,121,049 | A | 10/1978 | Roeber |
| 4,511,760 | A | 4/1985 | Garwin et al. |
| 5,495,077 | A | 2/1996 | Miller et al. |
| 6,088,069 | A | 7/2000 | Farlow |
| 6,879,318 | B1 | 4/2005 | Chan et al. |
| 2003/0085882 | A1 | 5/2003 | Lu |
| 2004/0021643 | A1 | 2/2004 | Hoshino et al. |
| 2004/0108992 | A1 | 6/2004 | Rosenberg |
| 2004/0108995 | A1 | 6/2004 | Hoshino et al. |
| 2004/0125044 | A1 | 7/2004 | Suzuki |
| 2005/0156901 | A1 | 7/2005 | Ma et al. |
| 2006/0016272 | A1 | 1/2006 | Chang |
| 2009/0160802 | A1* | 6/2009 | Yasumi .................. 345/173 |
| 2011/0141052 | A1* | 6/2011 | Bernstein et al. ......... 345/174 |
| 2011/0273819 | A1* | 11/2011 | Sokola et al. ......... 361/679.01 |

OTHER PUBLICATIONS

Berkelman, Tool-based haptic interaction with dynamic physical simulations using lorentz magnetic levitation, Phd Thesis submitted to the Robotics Program, Carnegie Mellon University, Published Jun. 1999.

* cited by examiner

*Primary Examiner* — Hung Duong
(74) *Attorney, Agent, or Firm* — Ober, Kaler, Grimes & Shriver; Royal W. Craig

(57) ABSTRACT

A suspension system for mounting a touch surface of a pressure sensitive touch display or panel. The suspension system comprises a frame and a flexible suspension membrane connected to the touch surface and the frame, the membrane allowing frictionless movement of the touch surface along the z-axis and resisting movement of the touch surface within the x-y plane. At least one force sensor is connected beneath the touch surface, whereby the touch surface is pre-loaded against the at least one force sensor.

19 Claims, 5 Drawing Sheets

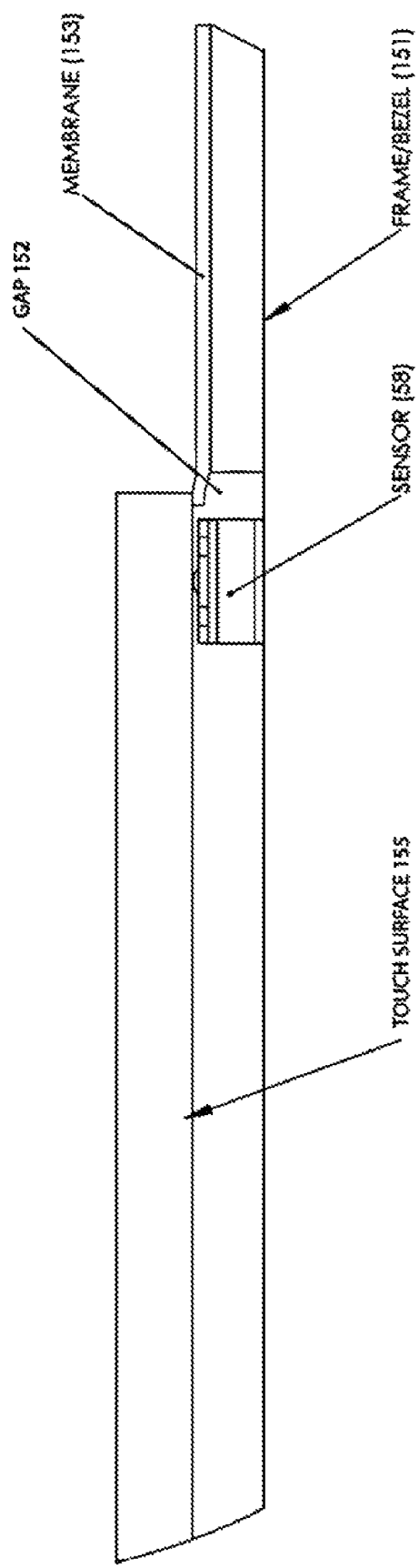

SUSPENSION FOR A PRESSURE SENSITIVE TOUCH DISPLAY OR PANEL

CROSS-REFERENCE TO RELATED APPLICATION(S)

This application claims the benefit of U.S. Provisional Application No. 61/270,344, filed Jul. 7, 2009, which is a continuation-in-part of International Application No. PCT/US2008/003374, filed Mar. 14, 2008, both of which are incorporated by reference.

BACKGROUND OF THE INVENTION

1. Field of the Invention

The present invention relates generally to input devices for electronics and, more particularly, to a suspension for a touch sensitive input panel's or display's touch surface especially suited for use in eBook readers, cellular phones and personal digital assistants (PDAs), PC Tablets, as well as laptops, PCs, office equipment, medical equipment, TVs Monitors, or any other device that uses touch sensitive displays or panels.

2. Description of the Background

Touch sensitive screens or touch surfaces can detect the application of fingers and other passive objects. Touch surfaces are gaining in popularity and have been deployed in many products in recent years. A number of different technologies have been used to create touch surfaces, such as resistive, capacitive, infrared, surface acoustic wave (SAW), and others. Resistive pads, for example, comprise two conductive plates pressed together. The disadvantage of a resistive pad is that the resistive membrane material will wear out, initially resulting in further reduced clarity followed by dead spots. In addition, the production yield is typically rather poor, and the technology has a few disadvantages such as a fixed (non-user adjustable) actuation force and the light throughput through the resistive membranes is typically only around 70% to 75%.

Capacitive touch screens/pads operate by measuring the capacitance of the passive object to ground, or by measuring the alteration of the transcapacitance between different sensors. An example of a capacitive touchpad is described in U.S. Pat. No. 5,495,077 to Miller. Capacitive pads are relatively expensive to manufacture compared to resistive pads, and can only detect objects with sufficient capacitance. Small objects, such as the end of a regular stylus or pen, do not have enough capacitance to ground or transcapacitance to be detected by a capacitive touchpad. The actuation force can also not be set, and the force may be as low as a 0 gram force, that is, the touch screen registers a touch even before the user's finger touches the screen. This often leads to difficulties in implementing certain end-user features, such as handwriting recognition.

SAW devices emit sound along the surface of the pad and measure the interaction of the passive object with the sound. These devices work well, but are generally much too expensive for general applications. Infra red light based displays work in a similar fashion, but this technology typically adds a large size and price.

Finally, there are devices that use force sensors to measure the location and magnitude of the force exerted by the passive object on the touchpad. Force sensing technology is very interesting from both feature and cost perspectives. A force sensitive touchpad will sense force applied by any sort of passive object, regardless of the electrical conductivity or composition of the object. Such devices were originally described in U.S. Pat. No. 3,657,475 to Peronneau et al. and U.S. Pat. No. 4,121,049 to Roeber. These devices measure the forces transmitted by the touchpad to a fixed frame at multiple points, for example, at the corners of the pad. Roeber discloses a mathematical formula for deriving the position and magnitude of the force applied by a passive object from the forces measured at the multiple points.

For example, U.S. Pat. No. 4,511,760 to Garwin et al., issued Apr. 16, 1985, shows a force sensing data input device responding to the release of pressure force. The input surface is provided with a transparent faceplate mounted on force-sensing piezoelectric transducers. Preferably, four piezoelectric transducers are provided, one at each corner of a rectangular opening formed in the frame. To determine the point of application of force on the input surface, the outputs of the four transducers are first summed. To constitute a valid data entry attempt, the sum must exceed a first threshold while the user is pushing on the input surface. When the user releases his finger, a peak of the sum is detected, which is of opposite polarity from the polarity of the sum in the pushing direction. The individual outputs of the four sensors at the time that the peak of the sum occurs are used to calculate the point of application of the force.

United States Patent Application 2003/0085882 by Lu published May 8, 2003, shows a touch pad device having a support layer with a plurality of strain gauges in a matrix configuration. A touch layer is disposed on top of the strain gauge matrix. The touch layer is joined to the top of the strain gauge matrix. Sensor wires connect the strain gauges to a processor that is programmed with an algorithm to measure the location and pressure of simultaneous, multiple touches.

United States Patent Applications 2004/0108995 and 2004/0021643 both by Hoshino et al. show a display unit with touch panel mounted above a display via four differentially-mounted sensors. The pressure sensors detect force with which a pointing device such as a finger pushes the panel surface, in real time. The force with which the pointing device such as a finger pushes the panel surface is found from the following equation irrespective of the pointing position: $P=a+b+c+d-a0+b0+c0+d0$, which equation detects dragging of a cursor.

United States Patent Application 2005/0156901 by Ma et al., issued Jul. 21, 2005, shows a touch screen display system with a display screen and overlying touch surface. An imaging system determines an angular position on the touch surface of the object coming in contact with the touch surface.

United States Patent Application 2006/0016272 by Chang, published Jan. 26, 2006, shows a thin film touch pad with opposed sensor elements that generate an electrical signal that is proportional to both the applied pressure and the surface area at the location of the applied pressure. As a result of the complementary and overlapping orientation of these sensor elements, the first and second sensor elements generate an asymmetric pair of signals that uniquely define the applied pressure by position and magnitude.

U.S. Pat. No. 6,879,318 by Chan et al., issued Apr. 12, 2005, shows a touch screen mounting assembly for a liquid crystal display (LCD) panel including a bottom frame having a seated backlight panel and a plurality of mounted pressure-sensitive transducers, an LCD panel, and a top frame for exerting pressure when mounted to the bottom frame such that a plurality of compressible springs biases the LCD panel towards the bottom frame when touched or contacted by a user. The claims require the bottom and top frame assembly with backlight panel mounted therein on springs, and an overlying LCD panel.

The market success for force based touch screens and pads has so far been very limited for various reasons. Current implementations employ complex mechanical structures and appropriate force-sensing sensors. A method to overcome the mechanical complexities (promising a low cost and small size penalty) is described in International Application No. PCT US2008/003374 filed Mar. 14, 2008, which employs a figure-8 suspension concept to ensure that the touch screen will not move in the x-y plane. This is therein illustrated in FIG. 1 which shows the profile of how the wire or line (15) is wrapped around the touch surface (10) and the back surface (14) in a figure-8 loop. The line (15) is wrapped around all 4 sides, creating 4 separate figure-8 loops or one combined (using 4 or 1 lines). The line suspension can be designed in a number of variants, where the line may be wrapped around the surfaces as in FIG. 1, or it may secure the surfaces through hole or channels into the corner or the surfaces, or connected to wire holders which are fastened to the surfaces. Either way, the principles remains the same, the built-in tension in the line pulls the touch surface (10) towards the base plate (14) applying a stable, pre-loaded force onto the 4 force sensors (41). The forces in the string is also centering the touch plane (10) in relation to the base plate (14) as the forces in the x-y plane applied to the 4 corners are directed to the center of the touch plane. This centering force will allow the touch plane to remain centered and not move in the x-y plane, but allow for the small friction free movement required in the z-direction, typically less then 0.1 mm distance when using a piezo resistive sensor (other force sensors may require a larger z-direction movement).

The foregoing configuration provides a good mechanical suspension with a close to zero loss in the touch force, yet the device is free to move frictionless in the z-direction thereby ensuring that all of the touch force will be distributed to four force sensors. Moreover, the suspension is very low cost in terms of components. However, the assembly process is not optimal. In addition, it is difficult to apply a dust or water seal which typically requires a rubber or silicon material to touch the touch lens, and the seal must typically also be tailor made as well as tested and verified for each new design.

It would be greatly advantageous to provide a suspension solution that preserves the mechanical aspects of the force based touch screen system in a way where the mechanical characteristics of the system described above are maintained, but with a design that is optimized for both high volume production as well as for a built in low cost and high performing water seal. The same platform components should also be capable of accommodating different sensor sizes/shapes, should allow for a more cost efficient suspension mechanism, and should be reusable from one product implementation to the next.

SUMMARY OF THE INVENTION

It is, therefore, an object of the present innovation to allow for cost efficient design and manufacturing of force sensing sensor-based touch screen products of different sizes, designs, and applications with one and the same conceptual component.

It is another object to provide a suspension solution that can be implemented and assembled at a low cost, and yet support different sensor types and sizes without any conceptual changes and a minimum of component changes.

It is another object to provide a suspension solution that also serves as water seal for the touch screen.

It is another object to provide a suspension solution that is less sensitive for external interference, such as vibrations.

These and other objects are accomplished by a mechanical suspension platform for sensor-based touch surface products that uses a suspension membrane component, for example, a flexible suspension membrane attached between the touch surface and frame for maintaining said touch surface in a suspended configuration, whereby it is afforded frictionless movement along a z-axis but is restrained from movement along the x-y plane.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 6 illustrates the alternative embodiment of a touch screen suspended to a rigid frame through a thin membrane, from an enlarged side view.

DETAILED DESCRIPTION OF THE PREFERRED EMBODIMENT

The present invention is a suspension platform for a touch sensitive input panel or display having a touch surface, which is especially suited for use in cellular phones, personal digital assistants (PDAs), and PC Tablets, as well as laptops, PCs, office equipment, medical equipment, TV Monitors, or any other device that uses touch sensitive displays or panels.

Figure 1:
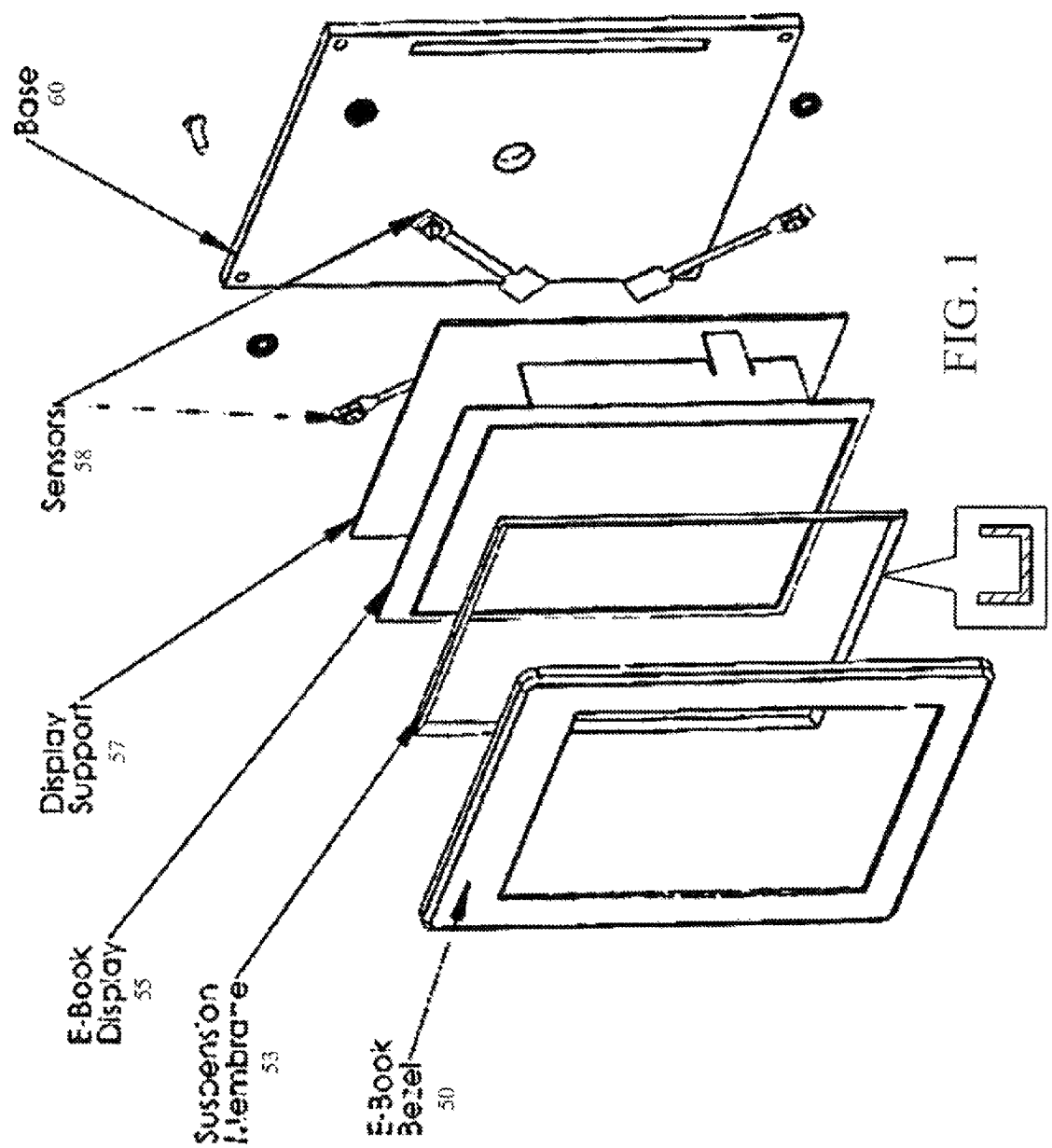
FIG. 1 illustrates a touch screen suspended to a rigid frame through a thin membrane, according to the present invention.
Figure 2:
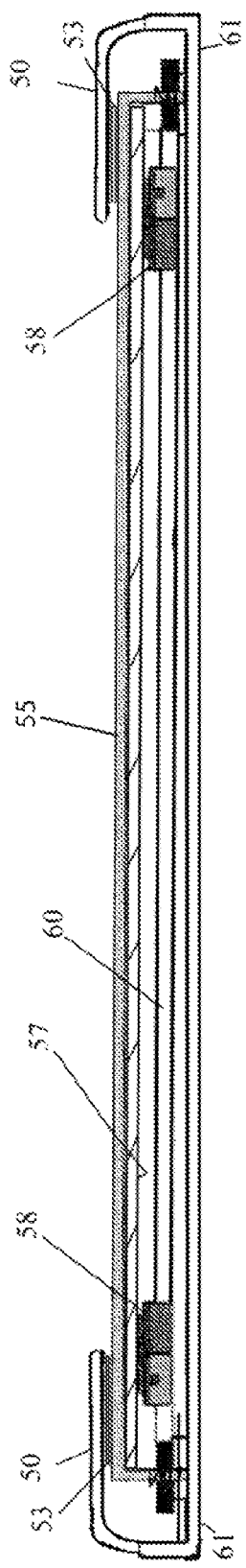
FIG. 2 illustrates a touch screen suspended to a rigid frame and pre-loaded through a thin membrane as in FIG. 1, from a side view.

FIG. 1 is an exploded view of a suspension platform according to one embodiment of the present invention incorporated in a touch sensitive input display for an eBook reader, and FIG. 2 is a side view.

In an embodiment, an eBook reader comprises an ePaper display (EPD) that is a touch surface 55 defining an x-y plane having a normal z-axis. The reader housing incorporates a bezel 50 that defines a touch plane on the touch surface 55. The bezel 50 is held in place by connecting it to a back housing 61 (see FIG. 2) of the eReader housing. The bezel 50 is also connected to a thin suspension membrane 53. The bezel 50 sits atop the suspension membrane 53, which in turn sits atop the touch surface 55. Because the touch surface 55 is an EPD that is a very thin and rather fragile, the touch surface 55 is strengthened and made more rigid by adding a display support 57. The display support 57 is a flat rigid plate that bears against four under-mounted differential pressure-sensors 58. The sensors 58 are mounted on a base support 60, such as a standard printed circuit board (PCB). The base support 60 provides the rigidity and flatness required for the sensors 58. Depending on the product implementation, the base support 60 may be seated directly onto the back housing 61 (see FIG. 2) of the unit, or if a double sided PCB is used for the base support 60, space may be available between the bottom of the base 60 and the back housing 61 (FIG. 2) of the unit. As the bezel 50 is mounted with the back housing 61 of the unit, the bezel 50 and the back housing 61 are forced together, which results in the bezel 50 applying a calibrated preload force through the membrane 53 to the touch surface 55 and display support 57 onto the sensors 58.

These differentially-mounted sensors 58 are connected through the base support 60 to an electronic device processor. This way, when a user touches the touch surface 55 at some (x,y) position, the force is transmitted through the touch surface 55 and the display support 57 to the four under-mounted differential pressure sensors 58, for example, piezo-resistive force sensors. Once the force is applied to the sensors 58, a change in output voltage is generated and continuously sent to the processor, where the output is registered and processed. The exact (x, y) "touch-coordinate" on the touch surface 55 is calculated.

As seen in the inset of FIG. 1, the suspension membrane 53 is a substantially rectangular elastomeric frame conforming to the peripheral shape of the touch surface 55. The bezel 50 is only in contact with the touch surface 55 through the suspension membrane 53. In the illustrated embodiment, the suspension membrane 53 is formed with three contiguous walls and is inwardly open, leaving a hollow interior air gap. The size of the gap is dependent on the elasticity of the membrane 53, the size of the touch surface 55, and the required pre-loading force. The suspension membrane 53 acts like an accordion. The bezel 50 presses down on the membrane 53 that presses on the touch surface 55, providing the pre-loading. Membrane 53 facilitates frictionless movement of the touch surface 55 towards the sensors 58 (along the z-axis) and yet restricts movement away from sensors (in the x-y plane). Moreover, the membrane 53 creates a dust and water tight seal for the unit.

In an alternative embodiment, rather than a bezel 50 of the frame pressing down onto the touch surface 55 via membrane 53, the bezel pulls the membrane and touch screen down onto the sensors.

Figure 3:
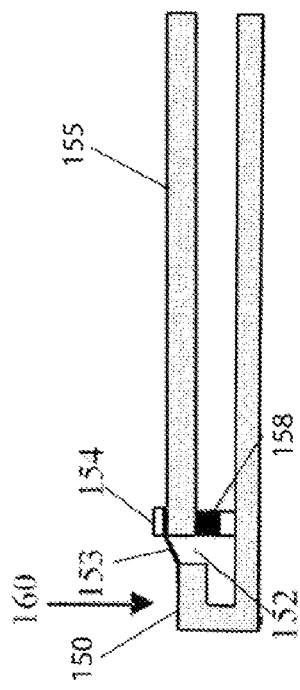
FIG. 3 illustrates an alternative embodiment of a touch screen suspended to a rigid frame through a thin membrane, from a side view.
Figure 4:
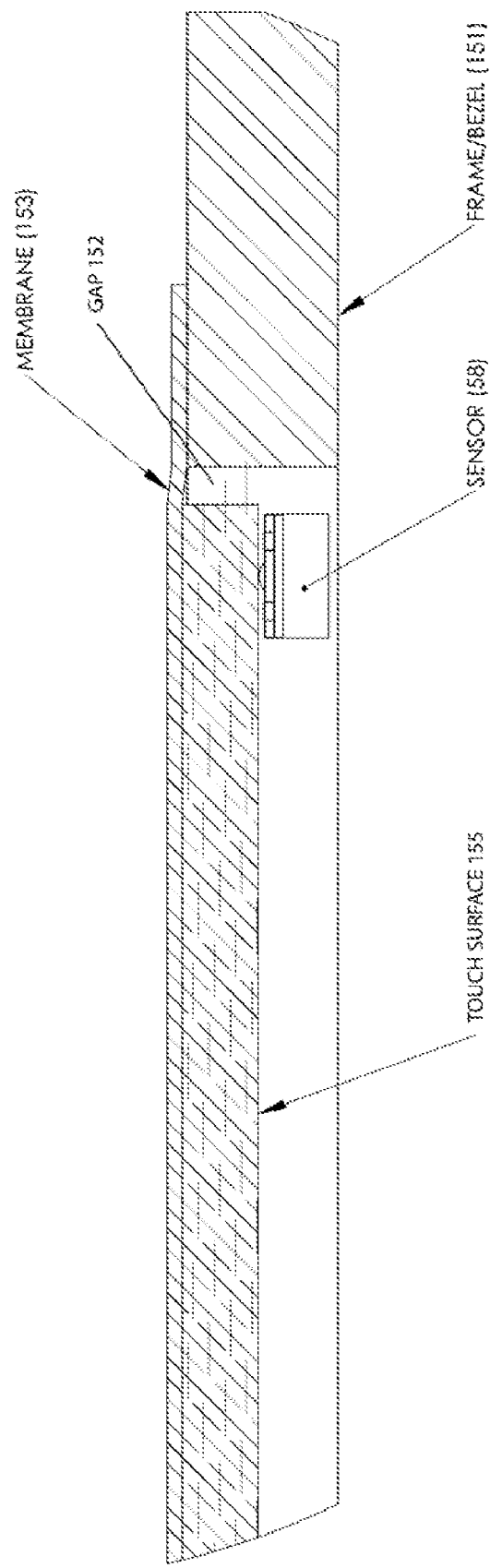
FIG. 4 illustrates the alternative embodiment of a touch screen suspended to a rigid frame through a thin membrane as shown in FIG. 3, from an enlarged side view.

FIGS. 3 and 4 illustrate an alternative embodiment of a touch sensitive display or panel having a touch screen in which the bezel 150 pulls the membrane 153 down, thereby pulling the touch screen 155 down on the sensors 158.

Here the above-described bezel 50 and back housing 61 are combined in a fixed frame 160 defining an outside structure, such as the housing of the product. There is a thin gap 152 between the frame 160 and the touch surface 155. A thin membrane 153 spans the gap 152, and the touch surface 155 is only connected to the fixed frame 160 through the membrane 153. The size of the gap 152 is dependent on the elasticity of the membrane 153, the size of the touch surface 155, and the required pre-loading force. The membrane 153 fixes the touch surface 155 relative to the frame 160 in the x-y plane. The membrane 153 may be a strip of plastic, rubber, silicon, adhesive tape, or similar material depending on the specific characteristics required of the actual product design. The membrane 153 can be kept very thin since it can be applied completely around the touch surface 155. If a side-force is applied to the touch surface 155, the 2 parallel sides and the opposite side of the membrane 153 resist the movement, virtually eliminating any side movement.

Figure 5:
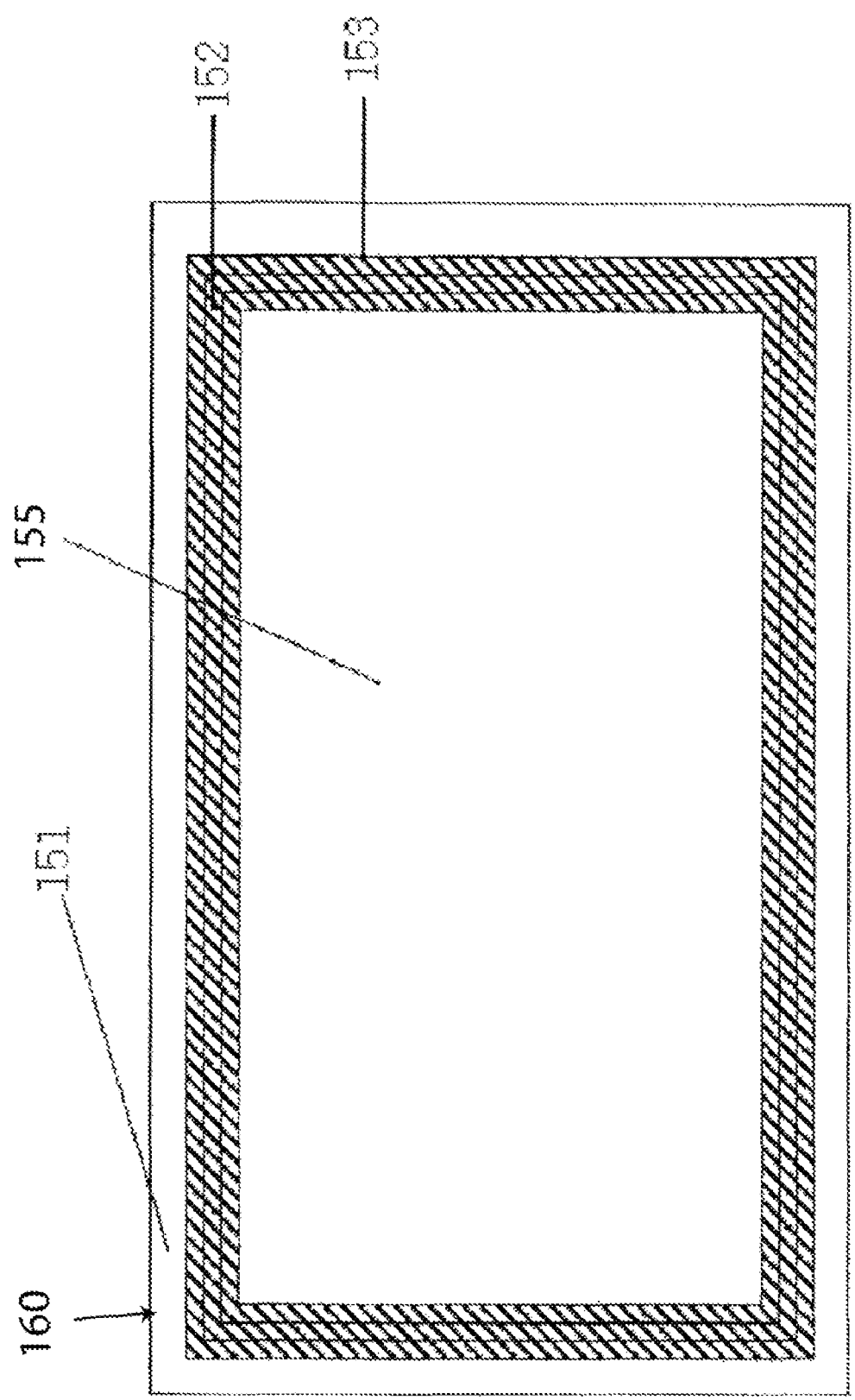
FIG. 5 illustrates the touch screen of FIG. 3 suspended to a rigid frame and pre-loaded through a thin membrane, from a top view.

FIG. 5 is a top view of the system of FIGS. 3 and 4. The membrane 153 holds the touch surface 155 in place within the outside frame 160, allowing for small movements in the z-direction while only creating minimal friction forces. As the required movement is typically in the area of 0.01 to 0.05 mm, the forces created from the stretching of the membrane 153 are minimal, if any. Other force sensors, such as traditional strain gauges may require a larger movement in the z-direction, and gap 152 and membrane 153 may be adjusted accordingly. In addition to the x-y-plane control, the suspension solution must also provide a preloading force to ensure that the touch surface 155 is always resting on the force sensors 158 and to reduce jitter from physical vibrations. The force applied in the z-direction towards the sensors 158 from the elasticity/spring effect from the membrane 153 will in most designs be sufficient, but if required, additional pre-loading may be applied by a spring, cantilevered bender, or similar spring-like component 154. Even when using a thin, elastic membrane 153, the touch surface 155 is kept fixed in the x-y plane. The membrane 153 provides no support in the z-direction, especially for small movements (<0.1 mm), which affords the touch surface 155 a very close-to-force and friction free movement in the z-direction (again <0.1 mm) as a force is applied through a user's touch.

FIG. 6 illustrates the alternative embodiment of a touch screen suspended to a rigid frame through a thin membrane, from an enlarged side view. In this embodiment, the membrane 153 is connected to the bottom of the touch surface 155—the side opposite the side of the touch surface 155 that is touched. The membrane 153 pulls the touch screen 155 down on the sensors 158.

Although in the illustrated embodiments, the touch surface is a surface of the display module, the touch surface may be a separate component. The present invention is not limited to any particular display module and may include, for example, EPD, LCD, OLED or other display modules.

One skilled in the art should understand that the material options are rather wide, and the complete system; frame (base), membrane, and touch screen can even be manufactured from one material; however, in most applications the three components will consist of different materials, such as a metal incased glass plate assembly for the touch surface, plastic product housing or bezel for the frame, and a plastic membrane part fixed onto the frame and display through strong, permanent adhesive.

This invention provides a few important benefits over the existing wire solution. The suspension membrane 53, 153 will very effectively seal the touch surface to the outside frame. It is impossible for humidity, dust, or liquid to penetrate in between the touch surface and the frame, even though they are mechanically not fixed connected.

The touch sensitive display or panel must have a touch surface and a base plate or base frame that holds the suspension system, which keeps the touch surface fixed in x-y plane with free micro movement in the z-direction. With the membrane approach, there is no need to add mechanical structures in order to fix the wire assembly to the touch surface and the base plate. This can further reduce the overall building height of the final product, which is extremely important from a touch sensitive display or panel competitive position.

The suspension membrane 53, 153 will also provide required pre-loading force in the z-direction for better sensor performance and minimizing negative effects from vibration and movement impact on the touch screen system.

This suspension mechanism, independent of which implementation is used, requires a very large force to further move the display away from the sensors. This will then eliminate a problem sometimes occurring with the wire approach in which the weight of the display overcomes the preloading force when the unit is held up-side down and one or multiple sensors lose contact with the display, resulting in an invalid touch screen input.

Finally, the manufacturing and the placement of the membrane is optimal for high volume manufacturing. The material costs are extremely low, and the manufacturing operation is similar to existing operations, such as placing a dust seal into a product.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. A suspension system for mounting a force sensitive touch display or panel having a touch surface defining an x-y plane with a normal z-axis, comprising:
   a frame;
   a suspension membrane connected to the touch surface and the frame for suspending the touch surface from the frame, the membrane allowing freedom of movement of the touch surface along the z-axis and resisting movement of the touch surface within the x-y plane; and
   at least one force sensor connected beneath the touch surface, whereby the touch surface is pre-loaded against the at least one force sensor.

2. The suspension system of claim 1, wherein the suspension membrane lies within the periphery of the touch surface.

3. The suspension system of claim 1, wherein the membrane is connected to the touch screen on the side of the touch surface that is touched, and the membrane extends beyond the periphery of the touch screen.

4. The suspension system of claim 3, wherein the membrane is connected to the frame below where the membrane connects to the touch screen, whereby the membrane presses down on the touch surface to create the pre-load on the touch surface against the at least one force sensor.

5. The suspension system of claim 1, wherein the membrane is connected to the touch screen on the side opposite the side on the touch surface that is touched, whereby the membrane pulls the touch surface down to create the pre-load on the touch surface against the at least one force sensor.

6. The suspension system of claim 1, wherein the membrane seals a gap between the touch surface and the frame preventing dust and water from passing.

7. The suspension system of claim 1, wherein the at least one force sensor comprises a piezo-resistive force sensor.

8. The suspension system of claim 1, wherein the at least one force sensor comprises one from the group consisting of a strain gauge, a load cell, and a force sensing resistor.

9. The suspension system of claim 1, wherein the at least one force sensor comprises two or more force sensors.

10. A suspension system for mounting a force sensitive touch display or panel having a touch surface defining an x-y plane with a normal z-axis, comprising:
    a frame having a bezel that projects over the touch surface;
    a suspension membrane connected to the touch surface and the frame for suspending the touch surface from the frame, the membrane allowing freedom of movement of the touch surface along the z-axis and resisting movement of the touch surface within the x-y plane, said membrane being interspaced between the bezel and the touch surface and situate within the periphery of the touch surface, and said bezel applying a downward force to the membrane to pre-load said touch surface;
    at least one force sensor connected beneath the touch surface, whereby the touch surface is pre-loaded against the at least one force sensor.

11. A touch sensitive display or panel, comprising:
    a touch surface defining an x-y plane having a z-axis that is normal to the x-y plane;
    a frame;
    a suspension membrane connected to the touch surface and the frame for suspending the touch surface from the frame, the membrane allows freedom of movement of the touch surface along the z-axis and resists movement of the touch surface within the x-y plane; and
    at least one force sensor connected beneath the touch surface, whereby the touch surface is pre-loaded against the at least one force sensor.

12. The touch sensitive display or panel of claim 11, wherein the membrane lies within the periphery of the touch surface on the side that is touched.

13. The touch sensitive display or panel of claim 11, wherein the membrane is connected to the side of the touch screen that is touched, and the membrane extends beyond the periphery of the touch screen.

14. The touch sensitive display or panel of claim 13, wherein the membrane is connected to the frame below where the membrane connects to the touch screen, whereby the membrane presses down on the touch surface to create the pre-load on the touch surface against the at least one force sensor.

15. The touch sensitive display or panel of claim 11, wherein the membrane is connected to the side opposite the side of the touch screen that is touched, whereby the membrane pulls the touch surface down to create the pre-load on the touch surface against the at least one force sensor.

16. The touch sensitive display or panel of claim 11, wherein the membrane seals a gap between the touch surface and the frame preventing dust and water from passing.

17. The touch sensitive display or panel of claim 11, wherein the at least one force sensor comprises one from the group consisting of a strain gauge, a load cell, and a force sensing resistor.

18. The touch sensitive display or panel of claim 11, wherein the at least one force sensor comprises two or more force sensors.

19. A touch sensitive display or panel, comprising:
    a touch surface defining an x-y plane having a z-axis that is normal to the x-y plane;
    a frame, the frame comprising a bezel that projects over the touch surface,
    a suspension membrane connected to the touch surface and the frame for suspending the touch surface from the frame, the membrane allowing freedom of movement of the touch surface along the z-axis and resisting movement of the touch surface within the x-y plane, the membrane being interspaced between the bezel and the touch surface and situate within the periphery of the touch surface on the side that is touched, whereby the bezel applies a downward force to the membrane to create the pre-load on the touch surface,
    at least one force sensor connected beneath the touch surface, whereby the touch surface is pre-loaded against the at least one force sensor.

* * * * *